United States Patent Office 3,553,302
Patented Jan. 5, 1971

3,553,302
METHOD OF PREPARING POLYOLEFIN RESIN PAPER
Rinnosuke Susuki, Tokyo, Hiroshi Hoshi, Narashino-shi, Jiro Saito and Hitoshi Iida, Tokyo, and Humio Ito, Ichikawa-shi, Japan, assignors to Lion Fat & Oil Co., Ltd., Tokyo, Japan
No Drawing. Filed Dec. 15, 1969, Ser. No. 885,340
Claims priority, application Japan, Dec. 20, 1968, 43/93,096; June 2, 1969, 44/42,474
Int. Cl. B29d 7/20
U.S. Cl. 264—49                                                       12 Claims

ABSTRACT OF THE DISCLOSURE

A method of preparing an opaque and white polyolefin resin paper comprising the steps of: kneading a member selected from the group consisting of gypsum, calcium sulfate hemihydrate and soluble anhydrite as the filler with a polyolefin resin, subjecting thus kneaded resin to sheet-molding, and subsequently hydrating said filler by means of bringing the resultant sheet into contact with water; and a method of imparting paintable as well as printable properties to said opaque and white polyolefin resin paper comprising the steps of: kneading calcium sulfite, in addition to said filler, with a polyolefin resin, subjecting thus kneaded resin to sheet-molding and dipping in water, and subsequently bringing the resultant sheet into contact with an inorganic acid.

BACKGROUND OF THE INVENTION

The present invention relates to a method of altering a sheet of such polyolefin resin as a copolymer containing polyolefin, polypropylene and ethylene monomer into the form of paper, and in particular relates to a method of making a polyolefin resin sheet white and opaque by means of hydrating calcium sulfate hemihydrate and/or soluble anhydrite. The present invention further relates to a method of imparting paintable as well as printable properties to a white and opaque polyolefin resin sheet by utilizing the acid-solubility of calcium sulfite.

As for the method of making a polyolefin resin sheet white and opaque, there has so far been developed a method wherein a white pigment such as titanium dioxide is employed for mixing in said resin sheet, but there has never been proposed such a method as utilizing the hydration of calcium sulfate hemihydrate and/or anhydrite for making a polyolefin resin sheet white and opaque. And, as for the method of imparting paintable or printable properties to a polyolefin resin sheet, a method employing surface treatment such as formation of a special coating layer onto the surface of said sheet has been known.

SUMMARY OF THE INVENTION

Calcium sulfate is classified into four types, namely, gypsum, calcium sulfate hemihydrate, soluble anhydrite and plaster of paris. Of these, calcium sulfate hemihydrate and soluble anhydrite can be reduced to extra-fine particles. And, gypsum is also capable of being reduced to fine grains and, not only that, is possessed of such properties that it is converted into calcium sulfate hemihydrate or soluble anhydrite at the molding temperature of polyolefin resin (ranging about 128–163° C.). Accordingly, the inventors of the present invention have come to a finding that, even in case where any of these pulverized calcium sulfates is employed in large quantities for mixing in a polyolefin resin, there is no fear of its impairing the inherent properties of said resin, and the resin thus treated retains its mold-processing properties and is capable of being molded into sheet.

When a polyolefin resin is kneaded with particles of calcium sulfate hemihydrate, soluble anhydrite or gypsum employed as the filler and is molded into sheet, the calcium sulfate contained in said sheet is in the state of hemihydrate or anhydrous even in case where gypsum is employed, and the outward appearance of the sheet shows an opaque, light milk-white color having a waxy luster peculiar to an olefin resin. This sheet, when left alone in the air, gradually increases in its whiteness in process of time, but the rate of the whitening is irregular.

The whitening of a polyolefin sheet brings about decrease in its waxy luster, making it to look like a paper sheet, and this is desirable from the viewpoint of utilization of said sheet as a packing material. The inventors of the present invention have proved the cause of the whitening of a polyolefin resin sheet containing the foregoing particles of calcium sulfate and finally come to a finding that it is attributable to a volume expansion attendant upon the change of calcium sulfate hemihydrate or anhydrite existing in the sheet into gypsum by virtue of the moisture absorbed gradually from the air. And, at the same time, it has also been clarified that the irregularity of the rate of said whitening is attributable to the fact that the rate of moisture absorption fluctuates with the temperature, a humidity, etc. of the air. In the light of these new findings with respect to the whitening of polyolefin resin sheet, the inventors of the present invention presumed that there might be obtained a uniformly white sheet by means of positively hydrating calcium sulfate contained in the sheet through bringing said sheet intact into contact with water immediately after molding. Thus, they applied a hydration treatment onto the sheet, and, to their surprise, there not only took place the whitening of sheet at a rate much higher than expected, but also was successfully obtained a sheet of uniform whiteness.

Furthermore, the inventors of the present invention have succeeded in preparing an opaque, white polyolefin resin sheet as provided with paintable as well as printable properties, by means of the steps that: in addition to the foregoing particles of calcium sulfate, particles of calcium sulfite were mixed by kneading in a polyolefin resin sheet; subsequent to the hydration treatment of thus processed sheet, it was brought into contact with an inorganic acid, thereby causing calcium sulfite existing near the surface of sheet to effuse.

Accordingly, a method of preparing an opaque and white polyolefin resin paper under the present invention comprises the steps that:

(a) a polyolefin resin mixed by kneading with at least one filler selected from the group consisting of gypsum, calcium sulfate hemihydrate and soluble anhydrite is molded into sheet, (b) a sheet thus obtained is brought into contact with water, thereby causing hydration of calcium sulfate hemihydrate existing near the surface of said sheet, and (c) upon finishing the hydration treatment, the sheet is dried.

And, a method of preparing a polyolefin resin paper having paintable as well as printable properties under the present invention comprises the steps that:

(a′) a polyolefin resin mixed by kneading with at least one filler selected from the group consisting of gypsum, calcium sulfate hemihydrate and anhydrite together with calcium sulfite is molded into sheet, (b′) a sheet thus obtained is dipped in water, thereby causing hydration of calcium sulfate hemihydrate and anhydrite existing near the surface of said sheet, (c′) upon completion of the hydration treatment, the sheet is brought into contact with an aqueous solution of inorganic acid, thereby causing calcium sulfite existing near the surface of said sheet to effuse, and (d') upon completion of the foregoing acid treatment, the sheet is rinsed and then dried.

It is to be understood that the term "polyolefin resin" used in this text (viz, the present specification) means a copolymer comprising a product from polymerization of olefin monomer such as polyethylene, polypropylene, etc. and an olefin monomer as a copolymer component. However, from the viewpoint of the cost, the property of matter, etc., medium/low pressure polyethylene and polypropylene are suitable to be employed as said polyolefin resin.

The amount of particles of calcium sulfate to be kneaded into a polyolefin resin may be selected in the range of 50% by weight to 90% by weight of the total amount of said resin and particles, but in case where particles of calcium sulfite are to be used jointly with that of calcium sulfate, it is advisable to set their total amount for kneading into the resin at 70% by weight. In case where these particles are employed in the amount as specified above, they are well miscible with a polyolefin resin. But, if necessary for facilitating the molding of said resin, an appropriate viscosity improver may be jointly employed, and, besides, any appropriate stabilizer and/or age resister may also be employed. The grain size of said particles can be selected in the range of $5\mu$ to $100\mu$ according to the intended thickness of sheet. A polyolefin resin containing said particles kneaded therein is capable of being easily formed into sheet through conventional molding methods employed for preparing polyethylene sheets and the like. The typical methods applicable to the present invention are calendering method and extrusion molding method.

Said polyolefin resin is subjected to hydration treatment subsequent to molding into sheet, and said hydration treatment is desirable to be carried out as soon as possible after said molding. The calcium sulfate hemihydrate and/or soluble anhydrite existing near the surface of said sheet are easily hydrated by means of dipping the sheet in water for several minutes and change into gypsum. In effect, therefore, the intended hydration may be performed only by causing said sheet intact to pass through a water-tank immediately after its molding. The water for use in said hydration suffices to be an ordinary fresh water, but it is preferable to dissolve therein some alum such as potash alum so as to accelerate the hydration reaction. According to the findings of the inventors of the present invention, an aqueous solution of the metal salt of nitric acid or hydrogen cyanide—especially aluminate, zincate or stannate—is suitable for effecting said hydration reaction. On this occasion, said metal salt is dissolved in water to the extent of 0.5% to 5% by weight. Said hydration reaction may be effected at a temperature in the range of about 0° C. to about 100° C., but it is usually appropriate to effect it at a temperature in the range of 10° C. to 30° C.

A polyolefin resin sheet upon completion of the foregoing hydration treatment can be made into an opaque and white resin paper by means of drying, but in case of preparing therefrom a resin paper having paintable and/or printable properties by means of kneading therein calcium sulfite in advance, said sheet is to be brought into contact with an inorganic acid subsequent to said hydration treatment. As the inorganic acid applicable in such acid treatment, there may be enumerated aqueous solutions of halogenated hydrogen such as hydrogen fluoride, hydrogen chloride, hydrogen bromide, etc., sulfuric acid, nitric acid, and mixed acids thereof. These acids are all capable of facilitating the dissolution of calcium sulfite without impairing the propertes of said polyolefin resin. But, among other inorganic acids, the aqueous solution of hydrogen chloride, viz hydrochloric acid is most popular and practical. The concentration of said hydrochloric acid may be selected appropriately within the range of 1% by weight to 10% by weight, but it is advisable that selection of said concentration be made in due consideration of its relation with temperature so as to avoid insufficient or excessive effusion of calcium sulfite.

The polyolefin resin sheet subjected to said acid treatment is thoroughly rinsed and then dried, whereby there is obtained a polyolefin resin paper having paintable properties.

As may be clear from the foregoing description, a polyolefin resin paper as provided by the present invention is free from a waxy luster peculiar to the polyolefin resin and is white-colored and opaque, having a close resemblance to paper in appearance. Moreover, as the inherent property of a polyolefin resin is not impaired at all, the resin paper according to the present invention can be widely utilized as, for instance, a packing material and so forth.

Further, such a resin paper under the present invention as prepared by causing the particles of calcium sulfite existing near the surface of sheet as set forth above to effuse by means of said acid treatment permits the drawing and/or writing thereon with pencil, ink, etc. and even the printing thereon.

The method of preparing a resin paper according to the present invention may be practiced by batch type operation as seen in the following example, but, for the purpose of mass production, it is naturally advantageous to employ a continuous system. As for said continuous system, however, inasmuch as the details thereof may be a patent fact to those skilled in the art and well understanding the present invention, discussion thereof will be omitted herein.

PREFERRED EMBODIMENTS OF THE INVENTION

Example 1

A mixture consisting of 20% by weight of a commercialized medium/low-pressure polyethylene and 80% by weight of gypsum was subjected to calendering at a processing temperature of 160±5° C., thereby obtaining a sheet of 0.1 mm. in thickness. Said sheet was immediately dipped in 10% aqueous solution of potash alum for 15 minutes. Then, it was pulled up and dried, whereby there was obtained a manufacture according to the present invention. The visible ray transmittancy and reflexibility of thus manufactured sheet as compared with a sheet not subjected to hydration treatment were as shown in the following Table 1.

TABLE 1

| | Sheet not hydrated | Sheet under the present invention |
|---|---|---|
| Visible ray transmittancy, percent | 65 | 22 |
| Visible ray reflexibility, percent | 34 | 77 |

Example 2

A mixture consisting of 15% by weight of a commercialized medium/low-pressure polyethylene, 10% by weight of a commercialized high-pressure polyethylene and 75% by weight of gypsum was extruded and spreaded by Tailfish-type T-die employing a 40 mm. extruder for molding into a sheet of 0.3 mm. in thickness, whereby a sheet of 0.1 mm. in thickness was prepared. Said sheet was immediately dipped in 10% aqueous solution of potash-ammonium alum for 15 minutes. Then, it was pulled up and dried, whereby there was obtained a manufacture according to the present invention. The visible ray transmittancy and reflexibility of thus manufactured sheet as compared with a sheet not subjected to hydration treatment yet were as shown in the following Table 2.

TABLE 2

| | Sheet not hydrated | Sheet under the present invention |
|---|---|---|
| Visible ray transmittancy, percent | 70 | 24 |
| Visible ray reflexibility, percent | 29 | 74 |

Example 3

A composition consisting of 30% by weight of a commericalized medium/low-pressure polyethylene and, as the filler, 35% by weight of calcium sulfite and 35% by weight of calcium sulfate was made into a sheet of 0.1 mm. in thickness by calendering (for monoaxial spreading).

In this connection, the foregoing calendering was carried out by employing a 2-roll type machine, wherein the rolls were 89 mm. in diameter and 200 mm. in length respectively and the number of rotations thereof were in the ratio 16:19 (r.p.m.), and under the conditions of the roll-clearance being 0.07 mm., the temperature being 160±5° C. and the time of calendering being 10–15 minutes.

A test piece measuring 100 mm. x 200 mm. was cut from the foregoing sheet and dipped in a water bath having a temperature adjusted to be in the range of 20±5° C. and containing 5% of aluminum nitrate for 15 minutes, thereby carrying out hydration treatment. Subsequently, thus treated sheet was dipped in an aqueous solution of 5% hydrochloric acid having a temperature adjusted to be in the range of 70±5° C. and containing 0.5% of cationic surface active agent (Arquad 2C/75 manufactured by Armour and Co.) for 5 minutes, thereby carrying out effusion treatment. Then, the sheet was rinsed and dried, whereby there was obtained a manufacture according to the present invention.

The visible ray transmittancy and reflexibility of thus manufactured sheet as compared with a sheet not subjected to the hydration and effusion treatment were as shown in the following Table 3.

TABLE 3

| | Sheet under the present invention | Sheet not subjected to hydration and effusion treatment |
|---|---|---|
| Visible ray transmittancy, percent | 8 | 48 |
| Visible ray reflexibility, percent | 90 | 50 |

NOTE: The visible ray transmittancy of an ordinary art paper is in the range of 10–12%.

Example 4

Except for modifying the amount of calcium sulfite and that of calcium sulfate employed as the filler to be 21% by weight and 49% by weight respectively, exactly the same apparatus, processing conditions and treatment conditions as that of Example 3 were applied, thereby obtaining a manufacture according to the present invention.

The visible ray transmittancy and reflexibility of thus manufactured sheet as compared with a sheet not subjected to the hydration and effusion treatment were as shown in the following Table 4.

TABLE 4

| | Sheet under the present invention | Sheet not subjected to hydration and effusion treatment |
|---|---|---|
| Visible ray transmittancy, percent | 7 | 48 |
| Visible ray reflexibility, percent | 91 | 50 |

Example 5

By employing a composition consisting of 30% by weight of a commercialized polypropylene and, as the filler, 21% by weight of calcium sulfite and 49% by weight of calcium sulfate, a sheet of 0.1 mm. in thickness was prepared by means of calendering (for monoaxial spreading) with a 2-roll machine as employed in Example 3.

In this connection, except for applying a temperature of 175±5° C., the conditions of processing were exactly the same as that of Example 3.

A sheet thus prepared was then subjected to hydration and effusion treatment under conditions exactly the same as that of Example 3, whereby there was obtained a manufacture according to the present invention.

The visible ray transmittancy and reflexibility of thus manufactured sheet as compared with a sheet not subjected to the hydration and effusion treatment were as shown in the following Table 5.

TABLE 5

| | Sheet under the present invention | Sheet not subjected to hydration and effusion treatment |
|---|---|---|
| Visible ray transmittancy, percent | 7 | 48 |
| Visible ray reflexibility, percent | 91 | 50 |

What we claim is:

1. A method of preparing an opaque and white polyolefin resin paper comprising the steps that:
   (a) a polyolefin resin kneaded with at least one of the fillers selected from the group consisting of gypsum, calcium sulfate hemihydrate and soluble anhydrite is molded into sheet;
   (b) a sheet thus obtained is brought into contact with water, thereby effecting hydration of calcium sulfate hemihydrate and anhydrite existing near the surface of said sheet; and
   (c) upon completion of the hydration treatment, the sheet is dried.

2. A method as defined in claim 1, wherein said polyolefin resin is a polyethylene prepared by medium/low-pressure process.

3. A method as defined in claim 1, wherein said filler has a grain size in the range of $5\mu$ to $100\mu$, and the amount of the filler kneaded in said resin is 70% by weight.

4. A method as defined in claim 1, wherein the solution for use in said hydration treatment as an aqueous solution of potash alum.

5. A method as defined in claim 1, wherein the solution for use in hydration treatment is an aqueous solution containing at least one metal salt selected from the group consisting of aluminum salt, zinc salt and tin salt of nitric acid and aluminum salt, zinc salt and tin salt of hydrogen cyanide, and having a concentration in the range of 0.5–5% by weight thereof.

6. A method of preparing an opaque and white polyolefin resin paper having paintable as well as printable properties which comprises the steps that:
   (a') a polyolefin resin mixed by kneading with at least one of the fillers selected from the group consisting of gypsum, calcium sulfate hemihydrate and soluble anhydrite together with calcium sulfite is molded into sheet;
   (b') a sheet thus obtained is dipped in water, thereby effecting hydration of calcium sulfate hemihydrate and anhydrite existing near the surface of said sheet;
   (c') upon completion of the hydration treatment, the sheet is brought into contact with an aqueous solution of inorganic acid, thereby causing calcium sulfite existing near the surface of said sheet to effuse; and
   (d') upon completion of the foregoing acid treatment, the sheet is rinsed and then dried.

7. A method as defined in claim 6, wherein said polyolefin resin is a polyethylene prepared by medium/low-pressure process.

8. A method as defined in claim 6, wherein said filler and calcium sulfite have respectively a grain size in the range of $5\mu$ to $100\mu$, and the amount of said two compounds kneaded in said resin is 70% by weight in the aggregate.

9. A method as defined in claim 6, wherein the solution for use in said hydration treatment is an aqueous solution of potash alum.

10. A method as defined in claim 6, wherein the solution for use in hydration treatment is an aqueous solution containing at least one metal salt selected from the group consisting of aluminum salt, zinc salt and tin salt of nitric acid and aluminum salt, zinc salt and tin salt of hydrogen cyanide, and having a concentration in the range of 0.5–5% by weight thereof.

11. A method as defined in claim 6, wherein said aqueous solution of inorganic acid is an aqueous solution of an inorganic acid selected from the group consisting of halogenated hydro-acid, nitric acid, sulfuric acid and mixed acids thereof.

12. A method as defined in claim 11, wherein said aqueous solution of inorganic acid is an aqueous solution of hydrogen chloride having a concentration of 1–10% by weight.

References Cited

FOREIGN PATENTS

| | | | |
|---|---|---|---|
| 924,461 | 4/1963 | Great Britain | 264—211 |
| 15,252 | 8/1966 | Japan | 264—211 |

ROBERT F. WHITE, Primary Examiner

G. AUVILE, Assistant Examiner

U.S. Cl. X.R.

106—111; 264—184, 211, 232